C. D. BABCOCK.
INDUCTION METER.
APPLICATION FILED APR. 28, 1909.
947,092.
Patented Jan. 18, 1910.
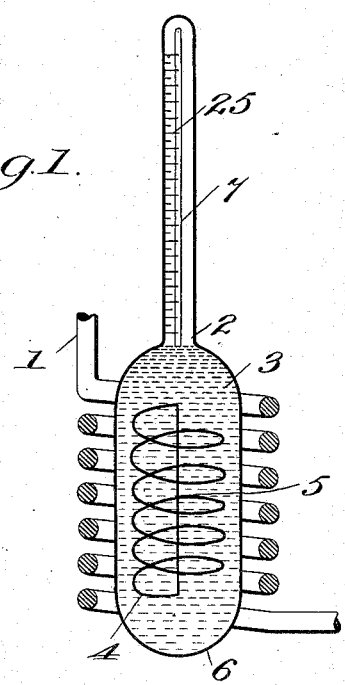
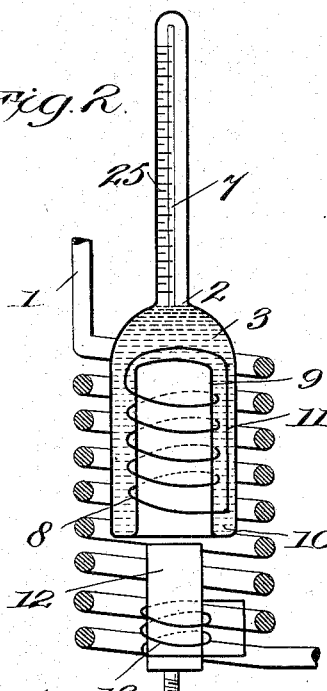
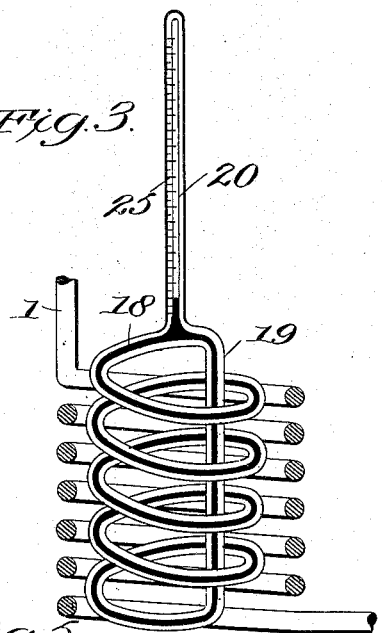
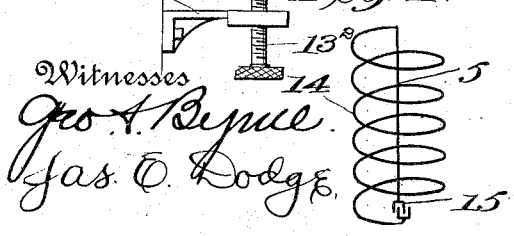
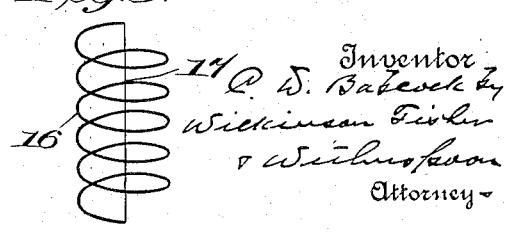
Witnesses
Geo. A. Byrne
Jas. O. Dodge
Inventor
C. D. Babcock by
Wilkinson Fisher
& Wilkinson
Attorney

UNITED STATES PATENT OFFICE.

CLIFFORD D. BABCOCK, OF JERSEY CITY, NEW JERSEY, ASSIGNOR TO UNITED WIRELESS TELEGRAPH COMPANY, OF NEW YORK, N. Y., A CORPORATION OF MAINE.

INDUCTION-METER.

947,092.   Specification of Letters Patent.   Patented Jan. 18, 1910.

Application filed April 28, 1909. Serial No. 492,787.

*To all whom it may concern:*

Be it known that I, CLIFFORD D. BABCOCK, a citizen of the United States, residing at Jersey City, in the county of Hudson and State of New Jersey, have invented certain new and useful Improvements in Induction-Meters; and I do hereby declare the following to be a full, clear, and exact description of the invention, such as will enable others skilled in the art to which it appertains to make and use the same.

This invention relates to inductive current meters, and especially to that class of inductive current meters which are adapted to measure the currents accompanying waves of very high frequencies that are met with in wireless telegraphic and telephonic signaling.

As is well known the waves accompanying wireless telegraphy and telephony are sometimes many millions per second and the energy of each wave is very small indeed, so that if a meter is to measure the energy pertaining to the accompanying current, it is essential that the meter shall be of such a nature that it will integrate or sum up all the minute currents pertaining to the multitude of short waves and will show the aggregate of such currents on some suitable indicator or register.

To these ends the invention consists in the novel details of construction and combinations of parts more fully hereinafter disclosed and particularly pointed out in the claims.

Referring to the accompanying drawings forming part of this specification in which like numerals refer to like parts in all of the figures, Figure 1 is a diagrammatic sectional view of one form of my invention; Fig. 2 a like view of a slight modification of the form shown in Fig. 1; Fig. 3 a like view of a still further modified form of my invention; Fig. 4 a modified form of the inductive heating member, and Fig. 5 a still further modified form of this latter member.

1, represents any suitable coil adapted to receive Hertzian waves, and particularly adapted for attachment to or forming a part of a suitable aerial; 2 a suitable container for a fluid 3 such as alcohol or other fluid capable of responding readily to changes in temperature; and 4 represents a suitable heating device for the fluid 3 preferably in the form of a solenoid closed upon itself by means of the straight portion 5 passing through the axis of the coil. The coils 1 and 4 are placed in inductive relation to each other as shown, and the coil 4 is placed in such relation to the fluid 3, that any heat energy that may be imparted to the coil will be delivered to the fluid 3. The vessel 2, in which the fluid is contained, is provided with an enlarged part or chamber 6, and a restricted or capillary part as 7; and of course when the fluid 3 in the part 6 expands through the agency of the heat delivered thereto, the fluid will rise in the capillary bore 7 and indicate on an enlarged scale any variations in volume due to its expansion that may occur in the part 6.

It is clear that the coils 1 and 4 are so related to each other that it makes no difference in which direction the waves may pass in the coil 1, for the induced currents as well as the Foucault currents flowing in the coil 4, will generate heat in the said coil 4 and thereby raise the temperature of the liquid 3 in the container 2, all as is well known. Since the cross section of the capillary tube 7 may be made as small as is desired in comparison to the cross section of the chamber 6, it is evident that the expansion of the liquid due to the heating effect of the coil 4 on the liquid 3 may be indicated on a scale enlarged as many times as may be necessary to produce an efficient instrument.

Referring to Fig. 2, the heating coil 8 is still immersed in the liquid 3, but the vessel 2 is provided with a hollow trunk 9 which extends up into the body or chamber 10, and the said coil 8 surrounds the trunk as illustrated. In this case the straight portion 11 of the coil 8 connects the ends of the same on the outside of the convolutions of said coil, and may be made of a material having a higher resistance than the rest of the coil if desired, so that it will heat up and radiate energy more rapidly. In this form of the invention the coil 1 extends down below the bottom of the chamber 10 and incloses an iron core 12 provided with its own independent heating coil 13, which core may be inserted or adjusted into the said trunk 9 at will, and thereby change the magnitude of the heating effect. Any suitable means for accomplishing this adjustment may be provided, but I have conventionally shown a screw $13^2$ working through a screw-threaded portion of a bracket 13'. It is evident that in this form of the invention the instrument is capable of ready adjustment for calibration or for rendering it more sensitive to feeble waves.

In Fig. 4 a modification of the heating coils just described, is illustrated, and 14 represents the usual helix with the straight portion 5 connecting its ends but provided in its length with a condenser 15, as shown.

In Fig. 5 the coil 16 is provided with a straight portion 17 which is made of a wire of platinum or of other suitable material which is much smaller in cross section or of a higher resistance than the wire of the rest of the coil 14. This portion 17 of the coil being preferably of a much smaller cross section than the remainder of the coil will heat up to a higher degree, and therefore transmit its energy very much more rapidly to the fluid 3 than will the rest of the coil.

Referring now to Fig. 3, the primary coil 1 remains as before but the secondary coil 18 is composed of a spiral of mercury or other suitable fluid incased in the container 19 provided with the capillary tube 20 as illustrated. In this case Foucault currents set up in the mercury will cause the same to expand and therefore to rise in the capillary tube 20. In all cases the scales 25 are suitably graduated to indicate the currents that are flowing through the coil 1. And it is evident that any other suitable indicating or registering device may be substituted for these scales.

Of course, it will be understood that this meter while particularly adapted for wireless telegraphy and telephony, is by no means limited to such arts, for it is evident that it may be used for unidirectional interrupted currents, as well as for alternating currents of low frequency as well as of high frequency and that it is capable of the widest and most extended use. Therefore I do not wish to be limited to the exact details of construction and arrangement of parts hereinafter disclosed except as may be required by the claims.

What I claim is:—

1. In a meter for varying currents, the combination of a primary coil, a secondary coil in inductive relation to said primary coil adapted to be heated by currents generated by said primary coil; and means to indicate the heating effects in said secondary coil, substantially as described.

2. In a meter for varying currents, the combination of a primary coil adapted to receive such currents, a closed secondary coil in inductive relation to said primary coil; a fluid in which said secondary coil is immersed, and means to measure the heating effects transmitted to said fluid, substantially as described.

3. In a meter for varying currents the combination of a primary coil adapted to receive alternating currents, a secondary coil in inductive relation to said primary coil, said secondary coil being provided with a member between its terminals having a higher resistance than the other portions of the coil; a liquid in which said secondary coil is immersed and means to measure the expansion of said liquid, substantially as described.

4. In a meter for varying currents the combination of a primary coil adapted to receive the currents to be measured, a closed secondary coil in inductive relation to said primary coil, a liquid in which said secondary coil is immersed, means to indicate the heating effects in said liquid and means to vary said effects, substantially as described.

In testimony whereof, I affix my signature, in presence of two witnesses.

CLIFFORD D. BABCOCK.

Witnesses:
 Moses Ely,
 Charles Fuller.